United States Patent [19]
Westberg

[11] 3,765,707
[45] Oct. 16, 1973

[54] PIPE JOINT

[75] Inventor: Alvar Torsten Westberg, Sandviken, Sweden

[73] Assignee: Sandvikens Vernverks Aktiebolag, Sandviken, Sweden

[22] Filed: Dec. 6, 1971

[21] Appl. No.: 205,123

[30] Foreign Application Priority Data
Dec. 9, 1970 Sweden.............................. 16636/70

[52] U.S. Cl................... 285/336, 285/407, 285/419
[51] Int. Cl............................................. F16l 21/06
[58] Field of Search..................... 285/336, 365, 366, 285/367, 407, 409, 410, 411, 73, 74, 419

[56] References Cited
UNITED STATES PATENTS

| | | | |
|---|---|---|---|
| 3,231,298 | 1/1966 | Tomb et al. | 285/365 X |
| 3,370,752 | 2/1968 | Abler | 285/365 X |
| 2,789,844 | 4/1957 | Kessler | 285/365 X |
| 3,398,978 | 8/1968 | Gasche | 285/367 X |
| 3,669,474 | 6/1972 | Bode | 285/336 |

FOREIGN PATENTS OR APPLICATIONS

| | | |
|---|---|---|
| 418,750 | 3/1965 | Switzerland |
| 819,024 | 10/1951 | Germany |
| 382,169 | 10/1932 | Great Britain |

*Primary Examiner*—James R. Boler
*Assistant Examiner*—Wayne L. Shedd
*Attorney*—Ralph E. Parker et al.

[57] ABSTRACT

For use in the food-processing industry, a pipe coupling for flanged pipes, which provides a joint free from inside crevices (where food particles might lodge) comprises annular opposed grooves on confronting faces of the flanges which grooves partially surround a sealing ring disposed between them, the back faces of the flanges being pressed together by a resilient clamping ring.

1 Claim, 3 Drawing Figures

Patented Oct. 16, 1973

3,765,707

PIPE JOINT

The present invention relates to pipe joints of the type wherein the pipe ends have opposed flanges secured together by means of a surrounding clamping ring (or equivalent device). The confronting faces of the flanges have annular opposed grooves which partly surround a sealing ring accommodated between the grooves. The pipe joint of the invention is especially meant for conduits in the food-production industry. In this connection a main demand is, and has been, that the coupling shall be free from inside crevices, slots and cavities, where food fragments may lodge and colonies of bacteria ensue. A further requirement is that the coupling should be easy to clean.

In the pipe joint according to the invention the grooves are therefore applied directly adjacent to the inner surfaces of the pipes so that there is formed a thin slit between them at the inner surfaces. The sealing ring can to a certain extent protrude through the slit and in that way prevent inside crevices or cavities. By having the grooves meet the inner surface of the pipes in a practically sharp edge a good sealing is secured. Also, between the opposed planes of the flanges situated outside the grooves there is usually formed a thin slit.

Hitherto known pipe joints of similar types have generally been made so that the opposed planes of the two flanges, except for the earlier-mentioned slit, could be entirely brought together by means of the clamping ring resulting in a rigid joint. In order to make the necessary clamping possible the back faces of the flanges usually had been inclined so that they diverged inwardly. The surrounding clamping ring had, then, an inwardly U-formed profile, and had been screwed together in order to clamp the flanges. When fast and simple mounting and dismounting have been required such pipe couplings have often been unsatisfactory. The cost of the pipe joint has also been relatively high i.a. because of the requisite precision of the conical surfaces in flanges and clamping ring, and the necessity of screw joints or the like.

The present invention provides a pipe joint which permits an extremely simple and fast mounting and dismounting. The mounting may thus be done without any tools and the dismounting by means of a screw driver or the like, in both cases by a simple motion of the hand.

In the coupling according to the invention the flanges are as a principle formed usually by simple, plain rings. The clamping ring, which generally consists of two clamps, is preferably made of moulded plastics, and usually has no separate clamping means. This in its turn results in a simplified and cheapened manufacture of the coupling compared to hitherto used constructions.

The invention will be made clear from the following specific description taken in connection with the accompanying drawings, in which.

Figure 1:
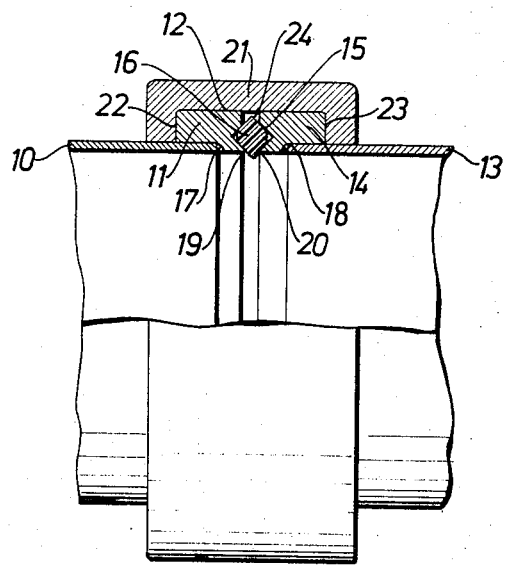
FIG. 1 is a longitudinal section of a part of a coupling according to the invention.

In FIG. 1 there is shown a pipe coupling in which tube 10 has a flange 11 with an annular groove 12 and tube 13 in the same way has a flange 14 and annular groove 15. The grooves lie alongside each other and together form a track which partly surrounds a sealing ring 16 consisting of an elastomer such as rubber or similar material. In the shown example the grooves are V-shaped, and the sealing ring originally has a circular cross-section. Within the scope of the invention a variety of other forms and types of grooves and sealing rings may exist, however. The flanges 11 and 14 consist of rings which are secured to the pipe ends by means of inside welds 17 and 18, respectively. The grooves meet the inner surfaces of the flanges in almost sharp edges 19 and 20, respectively, which edges tighten against sealing ring 16 protruding in the slit between the rings.

The flanges are surrounded by a clamping ring 21 whose inner flanks 22 and 23, respectively, substantially form a 90° angle with the axis of the tube except from the ends where they are wedge-shaped. By means of the wedge-shaped parts the flanges are pressed together when the two clamps of the clamping ring are brought towards each other.

Because the contact surface between flange and clamping ring makes a right angle with the central axis of the tube neither the axial force from the inner overpressure nor outer bending stresses can separate the clamps of the clamping ring. By the influence of the inner overpressure the flanges are pressed, by means of the sealing ring against the inner flanks of the clamping ring securing a contact along the contact surface just mentioned.

In order to make a fast and simple application of the clamping ring over the two flanges possible, the flanges may be, and usually are, so shaped that a thin slit 24 is formed between the opposed planes of the flanges. By these means a certain movement or compression of the flanges towards each other can take place when the clamping ring is applied.

Figure 2:
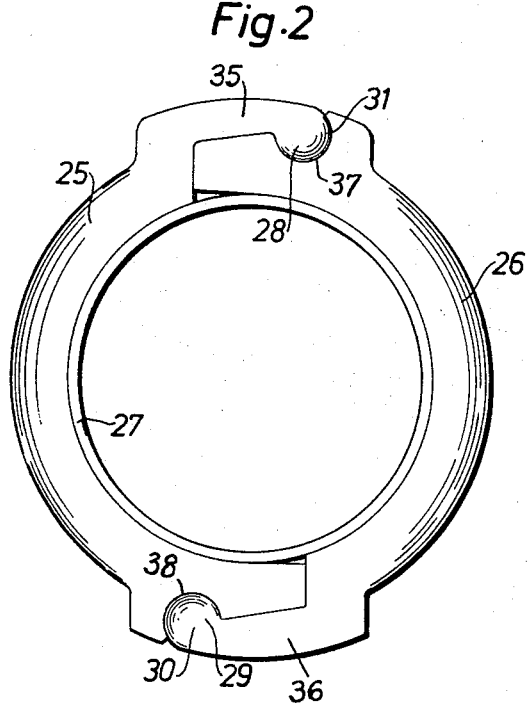
FIG. 2 represents a clamping ring for the pipe joint.

FIG. 2 shows a clamping ring which consists of two clamps 25 and 26. It surrounds two flanges (not visible) of which one is fastened to tube 27. The clamps are made of a material whose mechanical properties include the characteristic of a fast and complete recovery of form after a bending of the joint. This means that the clamps can be held together by simple locking devices 28 and 29, comprising resilient tongues 35, 36 provided with hooks 30, 31 and which are conformably configured to be accomodated in notches 37, 38 in the clamping ring itself. In certain cases, for instances, in a clamping ring of steel, it has sometimes been found more advantageous to use one or more separate locking devices which are applied to the clamping ring by welding or similar operation.

In the embodiment shown the one locking device forms a "hinge" 30, 31 on which the clamps revolve in the course of being combined. If a suitable material (for instance, a formaldehyde plastic) is used in the clamps the result may be that the joint cannot be separated by the hand alone, for instance by a mistake. On the other side, it is very simple to pry the clamps apart by means of a screw driver or similar pointed tool.

Figure 3:
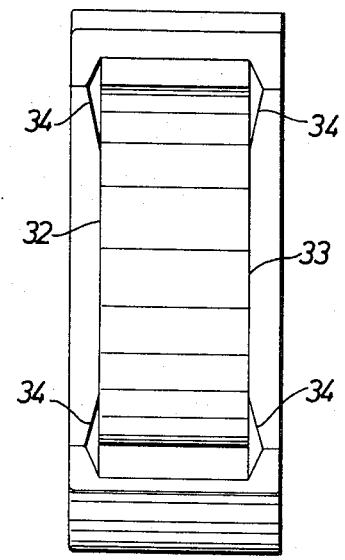
FIG. 3 shows one of the two clamps, which together form the clamping ring according to FIG. 2.

In FIG. 3 there is shown one of the two clamps which together form the clamping ring according to FIG. 2. The righthand clamp in FIG. 2 has been turned 90° so that there is shown the part facing inwardly against the tube. From FIG. 3 it is seen that the inner flanks 32 and 33 of the clamps form a right angle with the axis of the tube except in their ends where they are wedge-shaped. As was mentioned hereinbefore, the flanges are pressed together by means of the wedge-shaped parts 34, 34 when the clamps are brought towards each other.

The pipe joint of the present invention advantageously can be used for pressures in class NT6 and at a highest operating temperature of 100° C. In spite of the relatively simple and cheap shaping and the possibility of fast mounting and dismounting, the coupling has shown resistance to considerable inner overpressure. Thus, it has been proof against pressure testing with water of 25 kp/cm² pressure at room temperature.

I claim:

1. A pipe joint comprising opposed flanges (11, 14) on the pipe ends (10, 13) the adjacent faces of which have annular opposed grooves (12, 15) partly surrounding a sealing ring (16) accommodated between the grooves, the back faces (22, 23) of the flanges being surrounded by a resilient clamping ring (21), wherein the resilient clamping ring (21) consists of two principally equal parts or halves, preferably made of plastic, each comprising clamps (25, 26) and locking devices (28, 29) consisting of resilient tongues (35, 36) provided with hooks (30, 31) and corresponding notches (37, 38), the clamping ring parts or halves being designed to be brought together and locked by pivoting motion of each clamping ring part, at which motion the mentioned hook (30, 31) belonging to one half is supported in the mentioned notch (37, 38) belonging to the other half, while the remaining hook and notch form a locking device at the final period of the pivoting motion.

* * * * *

UNITED STATES PATENT OFFICE
CERTIFICATE OF CORRECTION

Patent No. 3,765,707                              Dated October 16, 1973

Inventor(s)  Alvar Torsten Westberg

It is certified that error appears in the above-identified patent and that said Letters Patent are hereby corrected as shown below:

On the cover sheet item [73] the assignee's name should read as follows:

-- Sandvik Aktiebolag --.

Signed and sealed this 30th day of April 1974.

(SEAL)
Attest:

EDWARD M. FLETCHER, JR.
Attesting Officer

C. MARSHALL DANN
Commissioner of Patents